June 15, 1954

B. N. FISHER

INITIATING AND ACTUATING MECHANISM FOR AUTOMATIC RECORD CHANGERS 2,681,227

Filed Aug. 27, 1949

3 Sheets-Sheet 1

INVENTOR.
BERNE N. FISHER
BY
James and Franklin
ATTORNEYS.

June 15, 1954

B. N. FISHER

INITIATING AND ACTUATING MECHANISM FOR AUTOMATIC RECORD CHANGERS 2,681,227

Filed Aug. 27, 1949

3 Sheets-Sheet 2

INVENTOR.

BERNE N. FISHER

BY

Jessup and Franklin

ATTORNEYS.

INVENTOR.
BERNE N. FISHER
BY
James and Franklin
ATTORNEYS.

Patented June 15, 1954

2,681,227

UNITED STATES PATENT OFFICE 2,681,227

INITIATING AND ACTUATING MECHANISM FOR AUTOMATIC RECORD CHANGERS

Berne N. Fisher, Roselle, N. J., assignor to General Instrument Corporation, Elizabeth, N. J., a corporation of New Jersey Application August 27, 1949, Serial No. 112,672

12 Claims. (Cl. 274—1)

The present invention relates to mechanism useable to initiate and control a record changing sequence in an automatic record player.

In automatic record changers, initiating or tripping mechanisms controlled by the movement of the tone arm over the record have taken a variety of forms. Most generally utilized today is the so-called velocity trip type, that is to say, one so constructed as to be responsive to the rate at which the tone arm moves over the turntable while tracking a given record. During reproduction of the record the grooves in which the stylus is received are relatively close together so that as the turntable rotates the tone arm moves thereover at a relatively low rate. At the end of the record the grooves are given a greater pitch, so that when the stylus tracks these grooves the tone arm is caused to move over the turntable at a relatively high rate. Various mechanisms have been employed which are capable of being operated or tripped only when the tone arm moves at its relatively high rate. In one of the simplest of such mechanisms a frictional connection is interposed between the tone arm and a controlling member, the controlling member moving inwardly with the tone arm and being intermittently cammed back by means of a lug rotating with the turntable, the lug engaging the controlling member a fixed number of times, generally once, for each rotation of the turntable. While the tone arm is moved at its low rate, the controlling member will be moved inwardly thereby only a short distance. When the tone arm moves at its high rate, the controlling member will be moved inwardly thereby a greater distance, thus permitting interengagement between an element carried by the controlling member and some other mechanism, so that when the controlling member is then cammed outwardly by the rotating lug, the actuating mechanism for the record changing sequence will be tripped.

It is a prime drawback of the type of initiating mechanism just described that the frictional connection between the tone arm and the controlling member is constantly being slipped. For each rotation of the turntable the frictional connection is slipped at least once. Obviously this is a source of wear, reducing the life and dependability of the record changer. Moreover, the constant intermittent contact between the rotating lug and the controlling member is a source of some noise, which cannot be completely eliminated even when soft bumpers are employed either on the lugs or the controlling member, and is also the source of appreciable vibration which often manifests itself in distorted reproduction.

One feature of the present invention is the incorporation, in an initiating mechanism of the type described, of an operative connection between the tone arm and the controlling member which is effective to move the controlling member toward the rotating lug only when the tone arm is moved across the turntable at its high rate. In other words, the only time that the lug will engage the controlling member is when the tone arm moves rapidly across the turntable. During reproduction of the record, at which time noise and vibration are most undesirable, the controlling member will remain stationary, out of engagement with the lug, so that the lug can rotate freely. It will be apparent that, in addition to eliminating noise and vibration, the operative connection between the tone arm and the controlling member is considerably longer lived than has heretofore been the case, since that connection is slipped only once for each record played, whereas in the case of the prior art mechanisms the operative connection is slipped once for each record groove, a given record often having several hundred grooves.

Another problem inherent in the control of the record changing sequence is the manner of connecting and disconnecting the actuating cam from a source of power so that the cam will cause a single sequence of record changing operations to be carried out, the cam thereafter automatically disconnecting from the source of power so as to permit reproduction to take place and yet be in a position where another record changing sequence can be carried out when desired. It has in the past been proposed to utilize a rotatable three-dimensional cam, that cam having connected thereto a clutch member which is movable between clutched and unclutched positions with respect to the source of power. Various expedients have been employed for moving the clutching mechanism but they have all been relatively undependable and fragile.

The present invention employs a moving member for the clutch member the position of which determines the movement of the clutch member between its clutched and unclutched positions. This moving member is provided with a catch adapted to cooperate with a support which forms a part of the record changer frame. The moving member, when in its catch-held position, holds the clutch member in its clutched position with respect to the source of power so long as the catch remains engaged with the support.

The cam itself is provided with a contact element which disengages the catch from the support at an appropriate time during the record changing sequence. The moving member is provided with a finger which, when the contact element trips the catch, engages a surface of the cam and is held by that surface in a position such that the clutch member remains clutched to the source of power. As the cam continues to rotate, a second portion of the surface comes opposite the finger, permitting the finger to drop, and thus permitting the moving member and the clutch member to move to positions in which the clutch member is unclutched from the source of power, thus removing the driving force from the cam and permitting it to come to rest. This will, of course, occur at the end of the record changing sequence.

The moving member is adapted to be moved to its catch-held position by a starting member carried by the cam, the position of that starting member being determined by a holding member adapted to be actuated by the controlling member which is operatively connected to the tone arm. It is only when the controlling member is cammed outwardly by the rotating lug (which will take place only after the tone arm has moved inwardly across the turntable at its high rate) that the holding member will be suitably actuated so as to permit the starting member to engage the moving member and move it to its catch-held position and the clutch member to its clutched position.

Thus, all of the elements of the record changing initiating and actuating mechanism here disclosed cooperate to produce a single useful result, to wit, the initiation of a record changing sequence only when the tone arm moves inwardly across the turntable at a high rate and the stopping of that sequence at an appropriate point. As an additional feature of interrelationship, it may be noted that, in the apparatus as here disclosed, the source of power for the record changing cam, to which the cam is connected and from which it is disconnected by appropriate positioning of the clutch member, is the selfsame rotating lug which acts upon the controlling member after the tone arm has moved inwardly at its high rate.

Another feature of the present invention is the utilization of a direct linkage between a manually operable initiating control member, which may be manipulated at will to cause a record changing sequence to start independently of the action of the tone arm and the starting member, that linkage being entirely independent of any part of the initiating or actuating mechanism previously discussed. As a result, manual initiation of a record changing sequence is rendered quite positive in function, and even if portions of the initiating or actuating mechanism should become damaged or should fail to operate properly, manual initiation of the record changing sequence can nevertheless be accomplished. This is an exceedingly significant feature since the initiating and actuating mechanism is normally of a relatively delicate nature involving the employment of springs and the like which have a tendency to become inoperative. By reason of the just described direct connection between the manually operable initiating control member and the moving member, control over the record changing sequence is possible without having to rely upon the more fragile and less dependable portions of the apparatus.

To the accomplishment of the foregoing objects and such other objects as may hereinafter appear, the present invention relates to the construction of a record changer initiating and actuating mechanism as defined in the appended claims and as described in this specification, taken together with the accompanying drawings, in which:

Figures 1, 2, 3:
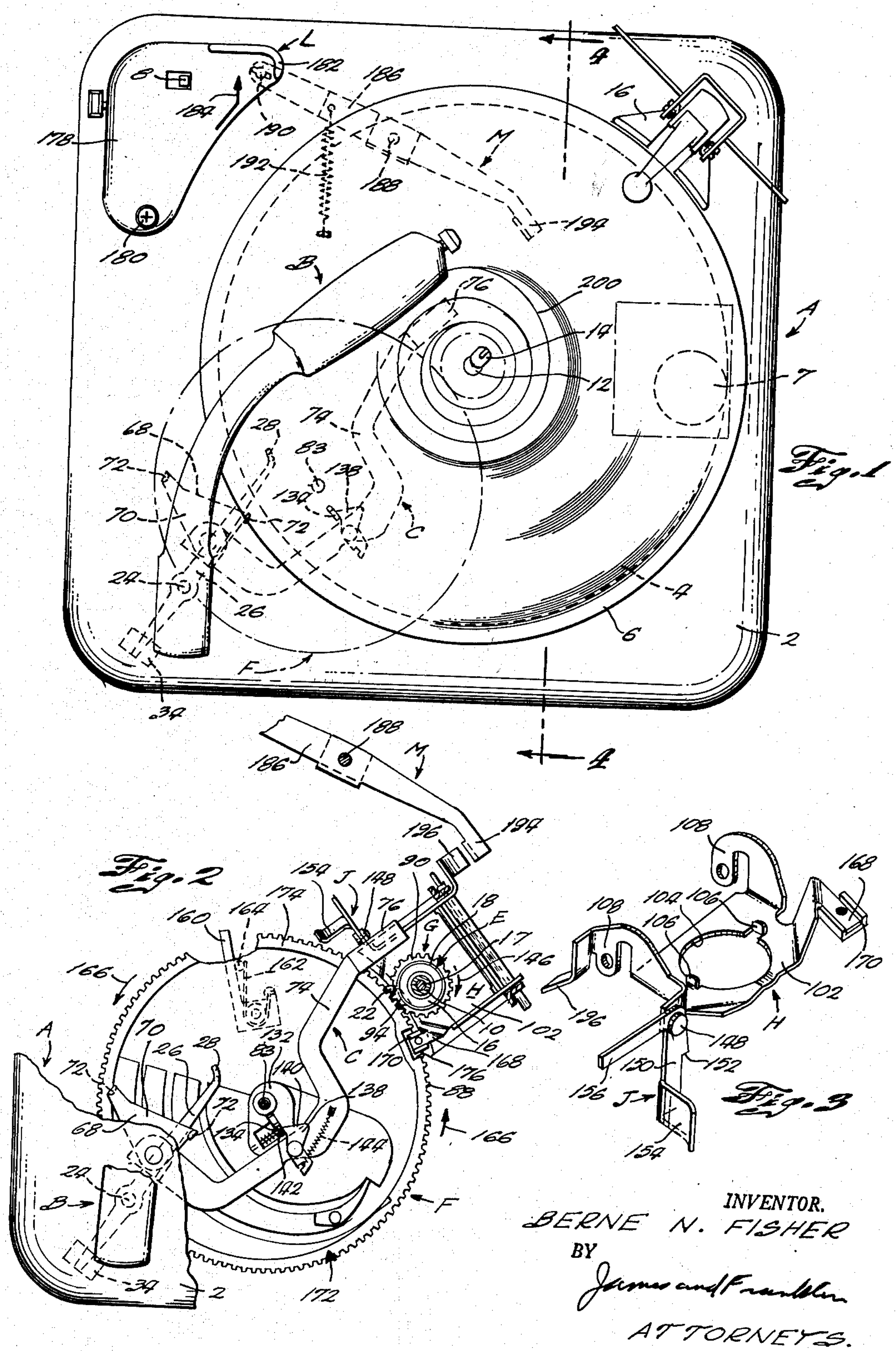
Fig. 1 is a top plan view of the record changer of the present invention.
Fig. 2 is a fragmentary top plan view similar to the lower left hand corner of Fig. 1 but with a portion of the base plate broken away so as to disclose the mechanism therebeneath.
Fig. 3 is a three-quarter perspective view of the moving member with catch attached.

Viewed broadly, the record changer of the present invention comprises a frame generally designated A having a tone arm B mounted thereon for engagement with a record and for movement over that record for reproduction thereof. A controlling member generally designated C is mounted on the frame and an operative connection D is provided between the tone arm B and the controlling member C, that operative connection being speed-sensitive and preferably of a type which is capable of transmitting high rates of motion from the tone arm B to the controlling member C but incapable of transmitting low rates of motion. Consequently, the controlling member C will be moved only when the tone arm B moves across the record at a relatively high rate. A power source E is provided which is adapted to drive the rotatable cam F at appropriate times, the cam F having operatively connected thereto a clutch member G which is movable between a clutched and unclutched position with respect to the power source E. A moving member generally designated H and shown in perspective in Fig. 3 is operatively connected to the clutch member G so that when the moving member H is positioned the clutch member G will also be positioned. A catch J is mounted on the moving member H and is adapted, when the member H is in one of its positions, to engage with a support K so as to retain the moving member H and the clutch member G in a given position. Mechanism is provided for releasing the catch J from the support K at an appropriate time during the record changing sequence so that the moving member H and the clutch member G can move to different positions to disengage the cam F from the power source E.

A manually operable initiating control member L is provided on the frame A and a direct linkage generally designated M is provided between the manually operable control member L and the moving member H so that when manual initiation of a record changing sequence is desired, that can be effectuated independently of the other and less dependable parts of the mechanism.

Viewed more in detail, the frame comprises a base plate 2 upon which a turntable 4 is rotatably mounted, the turntable being adapted to receive a record 6 thereon and the tone arm B being movable thereover for reproduction purposes. The turntable 4 may be rotated by any suitable rim drive 7 of appropriate construction, the details of which form no part of the present invention, energization of the motor of the rim drive mechanism 7 being controlled by switch 8 accessible from the top of the base plate 2. A central spindle 10 is fixedly mounted on the base plate 2 so as to project upwardly therefrom, the turntable 4 being rotatable thereabout, said spindle 10 having a record shifting button 12 at its top above which is a fixed offset portion 14 adapted to be received through the apertures of a stack of records held above the turntable. A peripheral support 16 is mounted on the base plate 2 for supporting the stack of records held above the turntable at their peripheries. Rotation of the button 12 by means of the shaft 17 passing through the hollow spindle 10 is effective to cause the records in the stack to drop one by one to the turntable 4 as is well known in the art.

The turntable itself is secured to a bushing 16 rotatable around the spindle 10, passing through the base plate 2 and having a collar 18 secured to the lower portion thereof by means of screw 20, that collar carrying a depending lug 22 which, therefore, will rotate constantly with the turntable. It is preferred that the depending lug 22 be surrounded by a bumper sheath 24 of rubber or other similar shock-absorbing material in order to reduce noise and vibration.

The tone arm B is of conventional form and is supported on shaft 24 which passes freely through the base plate 2 and is fixedly secured at its lower end to arm 26 one end 28 of which is provided with a cam follower 30 and the other end 32 of which may, if desired, be provided with a counterbalancing weight 34 secured thereto as by means of the screw and bolt 36. The shaft 24 has secured thereto the bracket 38, this bracket including a horizontal tongue 40 secured directly to the shaft 24 but within which the shaft 24 is rotatable, a vertical portion 42, an upper horizontal portion 44, and a pair of downwardly depending side wings 46 which are pivotally secured by means of the horizontal pin 48 to ears 50 depending from bracket 52 fixedly secured to the underside of the base plate 2. From this construction it is apparent that the tone arm B is pivotable with the shaft 24 about the axis of that shaft, the arm 26 moving therewith, and is also movable, along with bracket 38, about the substantially horizontal axis defined by the pin 48.

A screw 54 holds stud 56 to the underside of the base plate 2, the stud 56 having a depending core portion 58 terminating in an externally threaded tip 60. A bushing 62 is receivable over the core portion 58 and is held against the stud 56 by means of the stop nut 64 receivable over the threaded tip 60, a washer 66 being interposed between the stop nut 64 and the bushing 62. A connecting member 68 is rotatably mounted on the upper portion of the bushing 62, the member 68 comprising a flat upper portion 70 and a pair of separated depending fingers 72, these fingers straddling the end 28 of the arm 26, preferably with some clearance. Consequently, motion of the tone arm B about the axis of the shaft 24, which motion will take place when the tone arm is tracking the grooves of a record, will cause the arm 26 to pivot about the axis of the shaft 24 and consequently will cause the flat upper portion 70 of the connecting member 68 to move correspondingly.

The controlling member C may take the form of an elongated arm 74 of appropriate shape one end of which extends under the base plate 2 until it comes opposite the rotating lug 22, that end preferably being provided with a bumper sheath 76 of rubber or of similar shock-absorbing material, the other end of the arm 74 being rotatably mounted about the bushing 62. As here specifically disclosed, and in order to provide proper support for the long arm 74, the end of the arm 74 which is rotatably mounted on the bushing 62 is defined by a reversely bent portion including an upper horizontal portion 78 which is disposed close to the horizontal portion 70 of the connecting member 68. A quantity 80 of some speed-sensitive viscosity type clutching substance is interposed between the flat horizontal portions 70 and 78, the substance thus defining an operative connection which is capable of transmitting rapid motion from one connected member to the other but which is incapable of transmitting slow motion from one to the other. A substance suitable for this purpose is known generally on the market as silicone oil, a heat-stable organo-silicon oxide polymer made by combining silicon dioxide with methyl or ethyl groups of molecules derived from alcohols or with ethylene chloride or phenol. It is apparently the viscosity characteristics of this substance which impart to it the speed-sensitive transmission property described above. In order to ensure that the layer 80 of silicone oil will have the desired characteristics, the stop nut 64 is tightened against a shim having a thickness of .005 inch which is held between the stop nut 64 and the washer 66 and which is removed after the nut has been tightened. The significant property of the silicone substance is that, if the connecting member 68 be moved slowly, which will occur when the tone arm B is moving inwardly over the turntable at a slow rate, that motion will not be transmitted to the controlling member C. Hence, the bumper 76 carried at the end of the arm 74 will remain out of the path of the rotating lug 22. However, as soon as the tone arm B moves inwardly over the turntable at its high rate, as when it tracks grooves of high pitch, the arm 26 will be similarly moved and, through engagement with one of the depending fingers 72, the connecting member 68 will also be similarly moved. Since the silicone has the property of transmitting rapid motion, the arm 74 will be pivoted inwardly toward the rotating lug 22 so that as that lug rotates with the turntable 4 it will eventually engage with the bumper 76 on the end of the arm 74 and cam the arm 74 outwardly.

Also mounted beneath the main frame 2, supported thereon by bracket 82 and vertical post 83 secured to the base plate 2, is the rotatable three-dimensional cam F which is positioned under the end 28 of the arm 26, the cam follower 30 carried by the arm 26 cooperating with the three-dimensional cam surface of the cam F so as to control the position of the tone arm B during the record changing sequence in well known manner. The cam F is also provided with a fragmentary gear section 84 which, at an appropriate time during the rotation of the cam, engages with gear 86 to which is secured the shaft 17 which passes through the hollow spindle 10 so as to rotate the record shifting button 12 through a complete cycle. In this way the cam F controls, in timed relationship, the movement of the tone arm and the dropping of the record to the turntable.

The periphery of the cam F is provided with a gear 88 with which gear teeth 90 on the clutch member G are always engaged. The clutch member G is in the form of a bushing rotatably mounted on a central stationary shaft 92 and also slidable therealong. One of the gear teeth, here designated as the tooth 94, is elongated upwardly an appreciable distance beyond the other teeth and is positioned so as to be just below the path of the rotating lug 22. A series of spring fingers 96 are positioned above the clutch member G and engageable therewith, the fingers 96 also engaging a ball bearing assembly 98 positioned just below the bushing 16 connected to the turntable 4. Hence, the clutch member G is normally urged downwardly by the spring fingers 96 into a position in which a clearance 100 exists between the constantly rotating lug 22 and the elongated gear tooth 94. In this position the clutch member G is declutched from the constantly rotating lug 22, which constitutes the power source E, and the cam therefore is not rotated.

Figures 7, 8:
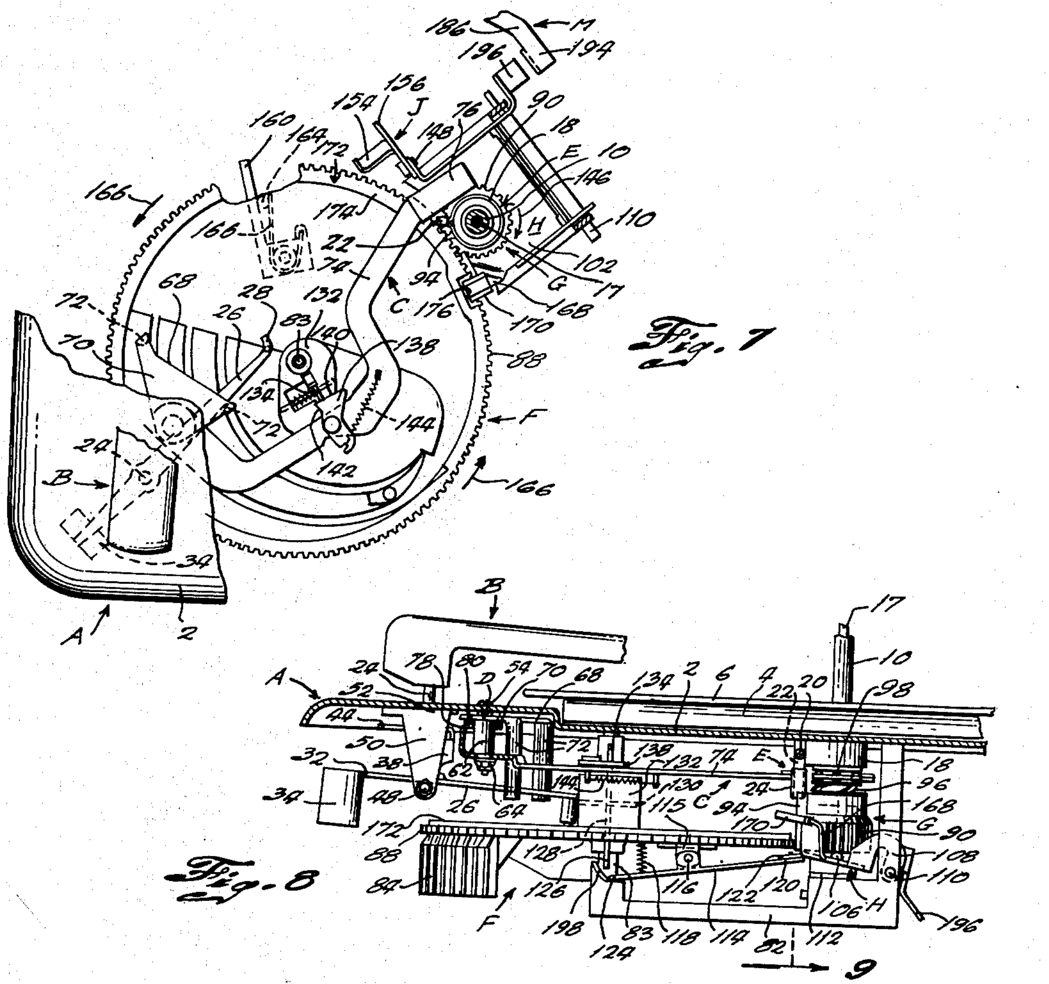
Fig. 7 is a view similar to Fig. 2 but showing the position assumed by the various parts of the apparatus just after the tone arm has moved inwardly at its high rate of speed.
Fig. 8 is a view on a reduced scale similar to Fig. 4 but showing the position of the parts after the moving member has been lifted to its catch-held position.
Figure 9:
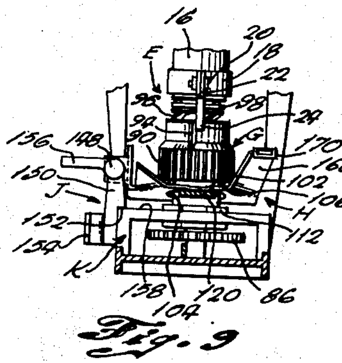
Fig. 9 is a detailed view showing the moving member, clutch member, and rotating lug, the moving member being in its catch-held position.
Figure 10:
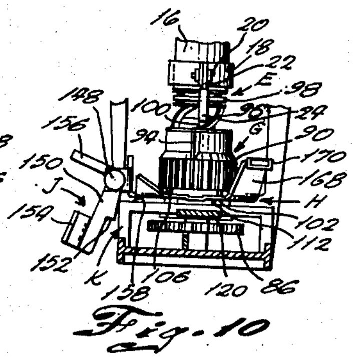
Fig. 10 is a view similar to Fig. 9 but showing the moving member in a non-catch-held position.

In order to move the clutch member G upwardly against the action of the spring fingers 96, so that the elongated gear tooth 94 can be engaged with and driven by the lug 22, the moving member H is utilized. As here specifically disclosed, that member has the shape best shown in Fig. 3 and includes a plate-like portion 102 having a central aperture 104 through which the central support 92 is adapted to pass and having upstruck lugs 106 on which the bottom of the clutch member G is adapted to rest. The use of two lugs 106 ensures even aligned motion of the clutch member G upwardly and downwardly along the central support 92, as the moving member H is moved, and the employment of but two points of contact rather than line or surface contact between the clutch member G and the moving member H permits rotation of the clutch member G when it is operatively connected to the power source E more readily than would otherwise be the case. The moving member H is itself pivotally connected, by means of ears 108 and pin 110, to a portion of the frame A. The moving member H is movable between an upper or first position best shown in Figs. 8 and 9, in which position the clutch member G is lifted into clutched position in operative connection with the power source E, and a second or lower position best shown in Figs. 4 and 10 in which the moving member H rests on the bottom support 112 which forms a part of the frame A and in which the clutch member G, as it rests on the lugs 106 of the moving member H, is in its declutched position.

Figures 4, 5, 6:
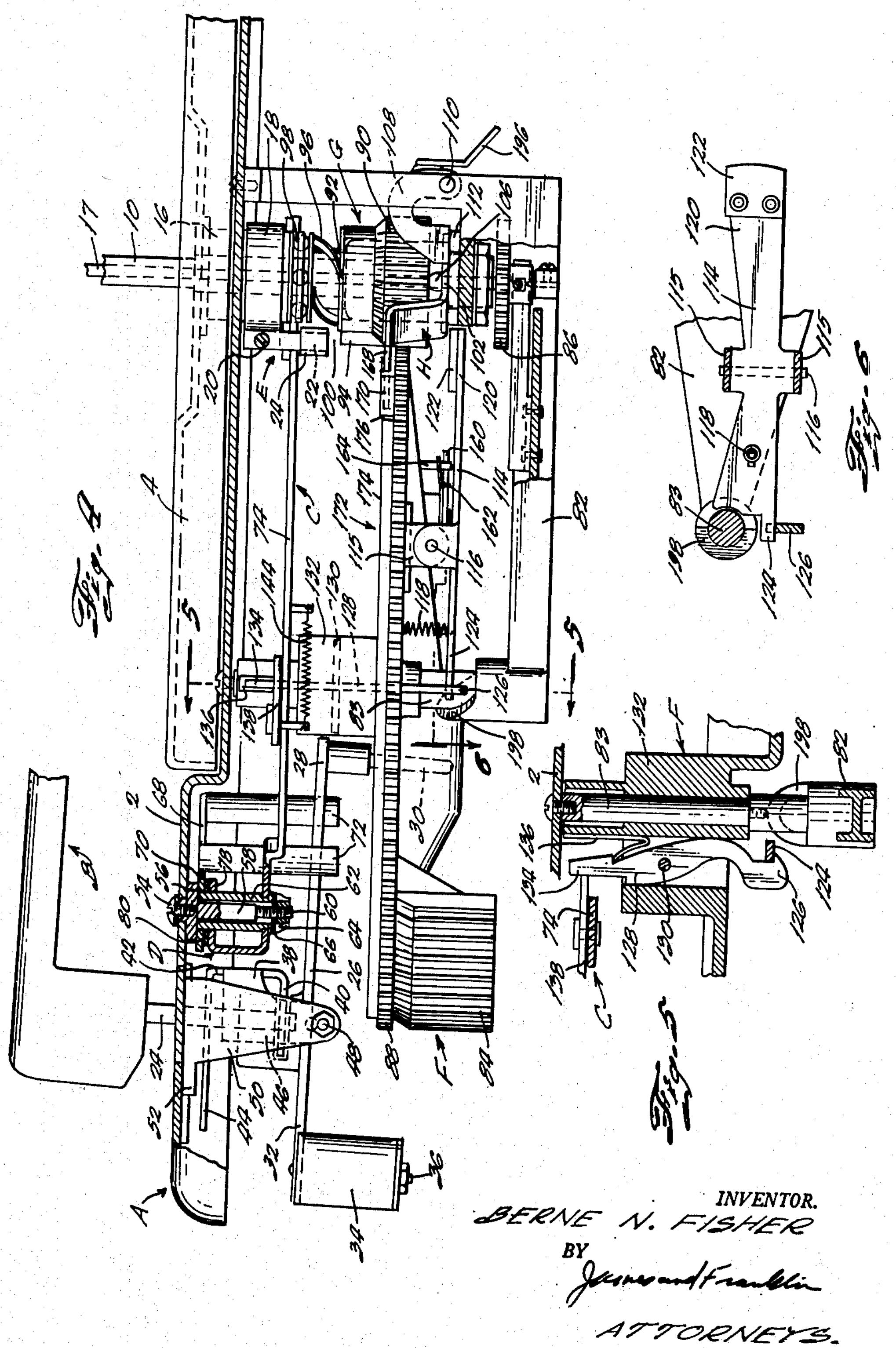
Fig. 4 is a side cross-sectional view on an enlarged scale taken along the line 4—4 of Fig. 1.
Fig. 5 is a detailed side cross-sectional view taken along the line 5—5 of Fig. 4.
Fig. 6 is a detailed top cross-sectional view taken along the line 6 of Fig. 4.

The underside of the cam F carries a starting member in the form of an arm 114 mounted on ears 115 depending from the cam F so as to pivot about the pin 116 and urged by compression spring 118, active between one end of the arm 114 and the underside of the cam F, to rotate in a counterclockwise direction as viewed in Fig. 4. The outer end 120 of the arm 114, which may be provided with a shock-absorbing pad 122 if desired, is positioned directly underneath the shelf-like portion 102 of the moving member H when that member is in its second or lower position. The inner end 124 of the arm 114 is normally held toward the cam against the action of the spring 118 by means of the hooked end 126 of a holding member in the form of an arm 128 pivotally mounted about pin 130, extending substantially vertically through the hub 132 of the cam, projecting thereabove and terminating in tip 134. Leaf spring 136 is active between the hub 132 and the holding member 128 so as to constantly urge that member to pivot in a counterclockwise direction as viewed in Fig. 5 so as always to cause the hooked end 126 thereof to engage with the end 124 of the cam 114.

The controlling member C has pivotally mounted thereon an element 138 having a front surface 140 and a side surface 142. A spring 144 constantly tends to cause the element 138 to rotate in a counterclockwise direction as viewed from above so as to bring the side surface 142 against the projecting tip 134 of the holding member 128 when the cam F is in its stationary position and when the controlling member C is in the position shown in Figs. 1 and 2, the bumper 76 carried on the end thereof being out of the path of movement of the rotating lug 22. When the controlling member C is moved inwardly into the path of the rotating lug 22 (see Fig. 7), the side surface 142 of the element 138 is moved beyond the tip 134 of the holding member 128, the front surface 140 of the element 138 snapping into position against the tip 134 under the action of spring 144. Thereafter, as the rotating lug 22 continues to rotate in the direction of the arrow 146 it will engage the bumper 76 on the end of the controlling member C and cam the bumper 76 outwardly so that the controlling member D will pivot in a counterclockwise direction as viewed in Fig. 7, the front surface 140 of the element 138 thus pivoting the holding member 128 about the axis 130 in opposition to the action of the leaf spring 136 so as to remove the hooked end 126 of the holding member 128 from the end 124 of the starting member 114. When this is done, the starting member 114 pivots in a counterclockwise direction as viewed in Figs. 4 and 8 so that the bumper 122 on the end 120 thereof will engage the underside of the moving member H and will lift that moving member to its position shown in Fig. 8, thus lifting the clutch member G into driven connection with the rotating lug 22.

The catch J is mounted on the moving member H so as to pivot about the pin 148. The catch J comprises a vertically depending arm 150 with a notch 152 therein, that arm having an outwardly projecting finger 154 at the end thereof. An arm 156 extends from the top of the depending arm 150 and at right angles thereto. As a result, the catch constantly tends to rotate in a counterclockwise direction as viewed in Figs. 3, 9 and 10. When the moving member H is in its lower position, the side of the arm 150 presses against the side of the support K against which it is pivotally urged by its own weight and that of the arm 156. When the moving member H is lifted by the starting member 114, the catch J is also lifted until the notch 152 on the arm 150 is raised above the top level 158 of the support K. As the cam F is rotated, the starting member 112 will be moved out from under the moving member H but the engagement between the notch 152 and the top surface 158 of the support K will retain the moving member H in its lifted position (see Fig. 9).

The cam is provided with a contact element in the form of an arm 160 pivotally mounted thereon and urged by spring 162 into an outwardly projected position determined by the positive stop 164. As the cam F rotates in the direction indicated by the arrow 166, this arm 160 will eventually be brought into engagement with the outwardly projecting finger 154 of the catch J so as to pivot said catch in a clockwise direction and thus cause the notch 152 to become disengaged from the top surface 158 of the support K. When this occurs, the moving member H will tend to drop under the influence of the weight of the clutch member G and the resilient force exerted by the spring fingers 96.

In the embodiment here disclosed, the degree and timing of the dropping of the moving member H is finally controlled by a finger 168 on the moving member H to which a bumper 170 may be secured, this finger extending over an upper surface 172 of the cam F, that surface having a first or raised portion 174 and a second or depressed portion 176. When the finger 168 is in engagement with the first or raised portion 174 of the surface 172, over which surface the finger 168 is adapted to slide as the cam F rotates, the moving member H is retained in an upper position such that the clutch member G supported by it remains in operative driving connection with the power source E. When the cam F has rotated sufficiently so that the finger 168 comes opposite the second or depressed portion 176 of the surface 172, the finger 168, and with it the moving member H, is permitted to fall, thus permitting the clutch member G to move downwardly, under the influence of its own weight and as urged by the spring fingers 96, to its declutched position with respect to the power source E.

In order to provide for manual control of the record changing mechanism, a switch plate 178 is pivotally mounted on the base plate 2 so as to pivot about pin 180, the switch plate 178 having a finger guard 182 adapted to be engaged by the finger of the user so as to pivot the switch plate 178 in the direction of the arrow 184 (see Fig. 1). The switch plate 178 thus constitutes the manually operable initiating control member L. A direct linkage is provided between the manually operable control member L and the moving member H, that linkage being here illustrated in extremely simple form as constituted by a simple lever 186 pivotally mounted beneath the base plate at 188 and connected at one end by a pin and slot connection 190 to the switch plate 178. A spring 192 tends to keep the lever 186 rotated in a counterclockwise direction and the switch plate 178 rotated in a clockwise direction so that the free end 194 of the lever 186 is separated from a rearwardly and downwardly inclined finger 196 on the moving member H. When the manually operable control member L, that is to say, the switch plate 178, is manually pivoted in the direction of the arrow 184, the lever 186 which constitutes the direct linkage M will be pivoted in a clockwise direction until the inner end 194 thereof engages the finger 196 and pushes it inwardly, thus positively causing the moving member H to pivot to its upper and catch-held position. This positively lifts the clutch member G to its clutched position in driven connection to the power source E, and as a result the cam F is rotated, giving rise to a record changing sequence. It will be noted that this manual initiation is positive in action, since direct pressure through a rigid linkage is exerted from the manually operable control member L through the moving member H to the clutch member G.

During the rotation of the cam F, the inner end 124 of the starting member 114 will be lifted by the stationary cam surface 198 until it once again engages with the hooked end 124 of the holding member 128, that member moving again to its holding position under the influence of the leaf spring 136 because rotation of the cam F will remove the projecting tip 134 thereof from the front surface 140 of the element 138 carried by the controlling member C. As the cam F rotates again to its position of rest, the upwardly projecting end 134 of the holding member 128 will come up against the side surface 142 of the element 138, thus causing the element 138 to pivot in a clockwise direction against the action of the spring 144.

The manner of operation of the record changer of the present invention is as follows. When the tone arm B is tracking the reproducing grooves of the record 6, it will move inwardly across the record at a slow rate. At it moves, the arm 26 will move therewith, that arm eventually engaging one of the downwardly depending fingers 72 on the connecting member 68 so as to move that member at the same angular rate. So long as that rate remains low, the speed-sensitive viscosity type clutch making operative connection to the controlling member C will, because of its inherent characteristics, transmit no motion thereto. During this time the various parts of the apparatus will take up the position illustrated in Fig. 2, the side surface 142 of the element 138 pivotally mounted on the controlling member C engaging the side of the projecting tip 134 of the holding member 128.

As soon as the tone arm B commences to track the terminal grooves 200 of the record 6 (see Fig. 1), which grooves are cut at a relatively high pitch, the tone arm B will move inwardly at a rapid rate and this rapid motion will be positively transmitted to the connecting member 68. The rapid motion of the connecting member 68 will, because of the characteristics of the silicone type clutch, be transmitted to the controlling member C, causing that controlling member to pivot inwardly to the position shown in Fig. 7, in which position the side surface 142 of the element 138 will be moved past the projecting tip 134 of the holding member 128, the spring 144 causing the element 138 to pivot in a counterclockwise direction so that its front surface 140 is brought opposite the tip 134 of the holding member 128. Very shortly thereafter, the constantly rotating lug 22 will engage the bumper 76 on the end of the controlling member C and positively cam the controlling member C outwardly so that it will pivot in a counterclockwise direction, the element 138 thus positively pivoting the holding member 128 against the action of the spring 136, releasing the starting member 114 and permitting that starting member to engage the underside of the moving member H and lift it sufficiently high so that the notch 152 in the catch arm 150 will engage with the upper surface 158 of the support K, retaining the moving member H in that upper position. When the moving member H is lifted the clutch member G is also lifted, against the action of the spring fingers 96, until the elongated gear tooth 94 is brought into the path of the constantly rotating lug 22, that lug thereafter rotating the clutch member G and the cam F so as to cause a record changing sequence to take place.

As the cam rotates, the finger 160 will trip the catch J, thus permitting the finger 168 on the moving member H to drop into engagement with the first or raised portion 174 of the cam surface 172 on the cam F. In this position the clutch member G is still in its clutched position and consequently the cam F will continue to rotate until the finger 168 comes into registration with the second or depressed portion 176 of the cam surface 172, at which time the moving member H is permitted to fall, the clutch member G falling and moving to its declutched position. The cam F will no longer be driven, will come to rest, and the record changing sequence will have been completed.

It will be apparent that the mechanism and mode of operation above described have numerous advantages over comparable prior art mechanisms and modes of operation in that the controlling member C is moved to a position in which it is cammed outwardly only when the tone arm B moves inwardly rapidly. This makes for less noise, less vibration, and less wear. The clutch member G is moved in a positive and efficient manner from its declutched to its clutched position, is positively retained in the clutched position until the record changing sequence is completed, and its motion is controlled by mechanism which is exceedingly compact and dependable. In addition, as has already been disclosed, manual initiation of the record changing sequence can be accomplished in a simple way and through the employment of a direct and positive linkage which short circuits all of the relatively less reliable or spring urged parts of the initiating and actuating mechanism previously disclosed, manual manipulation of the control member L positively moving the clutch member G to its clutched position.

It will be apparent that many variations may be made in the invention as herein disclosed without departing from the spirit of the invention as defined in the following claims.

I claim:

1. An initiating mechanism for a record changer comprising a frame, a tone arm mounted thereon for movement thereover at low and high rates, a controlling member movable between a first inoperative position and a second operative position for initiating a record changing sequence, and a clutch operatively connected between said tone arm and said controlling member, said clutch comprising a pair of clutch parts spaced from one another and relatively movable substantially parallel to one another, and a mass of silicone between and in frictional engagement with said clutch parts, said silicone mass thereby being subjected to surface frictional forces variable in accordance with the speed of relative movement of said clutch parts, said clutch thereby being effective to cause said controlling member to move from its first to its second position only when said tone arm is moved at its high rate.

2. An initiating mechanism for a record changer comprising a frame, a tone arm mounted thereon for movement thereover at low and high rates, a controlling member movable between a first inoperative position and a second operative position for initiating a record changing sequence, and an operative mechanical connection between said tone arm and said controlling member said connection including a clutch comprising a pair of spaced elements, one connected to said tone arm and the other to said controlling member and relatively movable in substantially parallel planes, said elements in turn being connected by a substance confined therebetween as a layer, frictionally engaging each of said elements and capable of transmitting high rates of motion from one element to the other but incapable of thus transmitting low rates of motion by means of variations in the surface frictional effect thereon, thereby causing said controlling member to move from its first to its second position only when said tone arm is moved at its high rate.

3. An initiating mechanism for a record changer comprising a frame, a tone arm mounted thereon for movement thereover at low and high rates, a controlling member movable between a first inoperative position and a second operative position for initiating a record changing sequence, said controlling member being pivotally mounted on a shaft, a connecting member also pivotally mounted on said shaft and engageable by said tone arm as it moves over said frame so as to be moved thereby, and a speed-sensitive clutch operatively connected between said controlling member and said connecting member, said clutch comprising a pair of clutch parts spaced from one another and relatively movable substantially parallel to one another, and a mass of silicone between and in frictional engagement with said clutch parts, said silicone mass thereby being subjected to surface frictional forces upon relative movement of said clutch parts and being sensitive to variations in the surface frictional effects thereon so as to cause said controlling member to move from its first to its second position only when said connecting member is moved by said tone arm at a relatively high rate of speed.

4. An initiating mechanism for a record changer comprising a frame, a tone arm mounted thereon for movement thereover at low and high rates, a controlling member movable between a first inoperative position and a second operative position for initiating a record changing sequence, said controlling member being pivotally mounted on a shaft, a connecting member also pivotally mounted on said shaft and engageable by said tone arm as it moves over said frame so as to be moved thereby, said members being spaced from one another and movable in substantially parallel planes, and a layer of silicone oil between said controlling member and said connecting member and in frictional engagement with each, said silicone being sensitive to variations in the surface frictional effects thereon so as to be effective to cause said controlling member to move from its first to its second position only when said connecting member is moved by said tone arm at a relatively high rate of speed.

5. An initiating mechanism for a record changer comprising a frame, a tone arm mounted thereon for movement thereover at low and high rates, a controlling member movable between a first inoperative and a second operative position for initiating a record changing sequence, said controlling member being pivotally mounted on a shaft, a connecting member also pivotally mounted on said shaft and engageable by said tone arm as it moves over said frame so as to be moved thereby, and an operative mechanical connection between said controlling member and said connecting member, said connection including a clutch comprising a pair of spaced elements, one operatively a part of said connecting member and the other operatively a part of said controlling member and relatively movable in substantially parallel planes, said elements in turn being connected by a substance confined therebetween as a layer, frictionally engaging each of said elements and capable of transmitting high rates of motion from one element to the other but incapable of thus transmitting low rates of motion by means of variations in the surface frictional effects thereon, thereby causing said controlling member to move from its first to its second position only when said tone arm is moved at a relatively high rate of speed.

6. The initiating mechanism of claim 5 in which said substance confined between said relatively movable elements comprises a silicone oil.

7. An initiating mechanism for a record changer comprising a frame, a tone arm mounted thereon for movement thereover at low and high rates, a constantly rotating lug on said frame, a controlling member movable between a first position out of the path of movement of said lug and a second position in the path of movement of said lug, said controlling member when in its second position being cammed outwardly by said lug so as to initiate a record changing sequence, and a speed-sensitive operative mechanical connection between said tone arm and said controlling member, said connection including a clutch comprising a pair of relatively movable elements, one connected to said tone arm and the other to said control member, said elements in turn being mechanically connected by a substance confined therebetween in the form of a layer and inherently capable of transmitting high rates of motion from one element to the other but incapable of thus transmitting low rates of motion, thereby being effective to cause said controlling member to move from its first to its second position only when said tone arm is moved at its high rate.

8. The initiating mechanism of claim 7 in which said substance defined between said relatively movable elements comprises a silicone oil.

9. An initiating mechanism for a record changer comprising a frame, a tone arm mounted thereon for movement thereover at low and high rates, a constantly rotating lug on said frame, a controlling member movable between a first position out of the path of movement of said lug and a second position in the path of movement of said lug, said controlling member when in its second position being cammed outwardly by said lug so as to initiate a record changing sequence, and a clutch operatively connected between said tone arm and said controlling member, said clutch comprising a pair of relatively movable clutch parts and utilizing silicone as the material for drivingly connecting said relatively movable clutch parts, said clutch thereby being effective to cause said controlling member to move from its first to its second position only when said tone arm is moved at its high rate.

10. An initiating mechanism for a record changer comprising a frame, a tone arm mounted thereon for movement thereover at low and high rates, a constantly rotating lug on said frame, a controlling member movable between a first position out of the path of movement of said lug and a second position in the path of movement of said lug, said controlling member when in its second position being cammed outwardly by said lug so as to initiate a record changing sequence, said controlling member being pivotally mounted on a shaft, a connecting member also pivotally mounted on said shaft and engageable by said tone arm as it moves over said frame so as to be moved thereby, and a speed-sensitive clutch operatively between said controlling member and said connecting member and comprising a pair of relatively movable elements, one connected to said controlling member and the other to said connecting member, said elements in turn being connected by a substance confined therebetween as a layer and inherently effective to cause said controlling member to move from its first to its second position only when said connecting member is moved by said tone arm at a relatively high rate of speed.

11. An initiating mechanism for a record changer comprising a frame, a tone arm mounted thereon for movement thereover at low and high rates, a constantly rotating lug on said frame, a controlling member movable between a first position out of the path of movement of said lug and a second position in the path of movement of said lug, said controlling member when in its second position being cammed outwardly by said lug so as to initiate a record changing sequence, said controlling member being pivotally mounted on a shaft, a connecting member also pivotally mounted on said shaft and engageable by said tone arm as it moves over said frame so as to be moved thereby, and a layer of silicone oil between said controlling member and said connecting member effective to cause said controlling member to move from its first to its second position only when said connecting member is moved by said tone arm at a relatively high rate of speed.

12. An initiating mechanism for a record changer comprising a frame, a tone arm mounted thereon for movement thereover at low and high rates, a constantly rotating lug on said frame, a controlling member movable between a first position out of the path of movement of said lug and a second position in the path of movement of said lug, said controlling member when in its second position being cammed outwardly by said lug so as to initiate a record changing sequence, said controlling member being pivotally mounted on a shaft, a connecting member also pivotally mounted on said shaft and engageable by said tone arm as it moves over said frame so as to be moved thereby, and an operative mechanical connection between said controlling member and said connecting member, said connection including a clutch comprising a pair of relatively movable elements operatively connected respectively to said controlling member and to said connecting member, and, as a motion-transmitting medium, a substance confined between said two elements in the form of a layer and inherently capable of transmitting high rates of motion from one element to the other but incapable of thus transmitting low rates of motion, thereby causing said controlling member to move from its first to its second position only when said connecting member is moved by said tone arm at a relatively high rate of speed.

(References on following page)

References Cited in the file of this patent

UNITED STATES PATENTS

| Number | Name | Date |
|---|---|---|
| 1,540,407 | La Rue | June 2, 1925 |
| 1,969,755 | Kellog | Aug. 14, 1934 |
| 2,211,423 | Hokanson | Aug. 13, 1940 |
| 2,270,179 | Wright | Jan. 13, 1942 |
| 2,287,098 | Habegger | June 23, 1942 |
| 2,287,727 | Cranmer | June 23, 1942 |
| 2,289,356 | Green | July 14, 1942 |
| 2,298,988 | Todd | Oct. 13, 1942 |
| 2,330,293 | Knox | Sept. 28, 1943 |
| 2,426,978 | Alexanderson | Sept. 9, 1947 |
| 2,428,258 | Alexanderson et al. | Sept. 30, 1947 |
| 2,435,264 | Ansar | Feb. 3, 1948 |
| 2,436,529 | Pressley | Feb. 24, 1948 |
| 2,460,116 | Bazley | Jan. 25, 1949 |

FOREIGN PATENTS

| Number | Country | Date |
|---|---|---|
| 610,589 | Great Britain | Oct. 18, 1948 |